June 3, 1958
S. E. ROSS
2,837,231
BALE-HANDLING ATTACHMENT FOR INDUSTRIAL TRUCKS AND THE LIKE
Filed Aug. 2, 1955
2 Sheets-Sheet 1
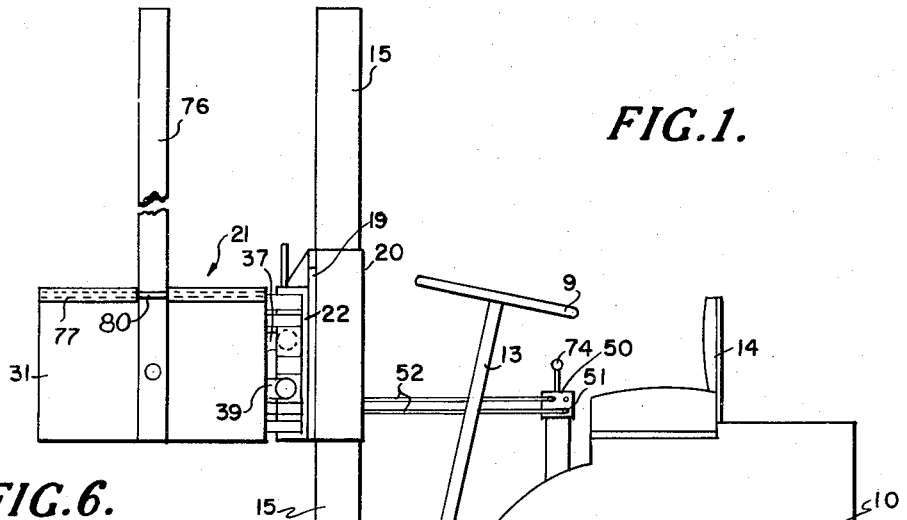
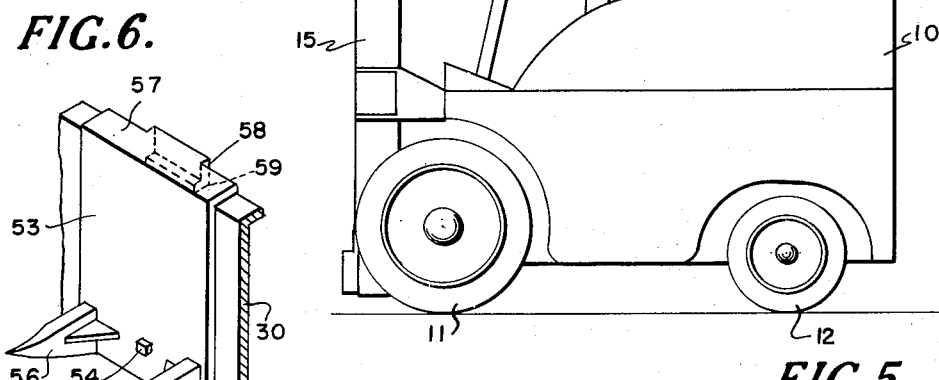
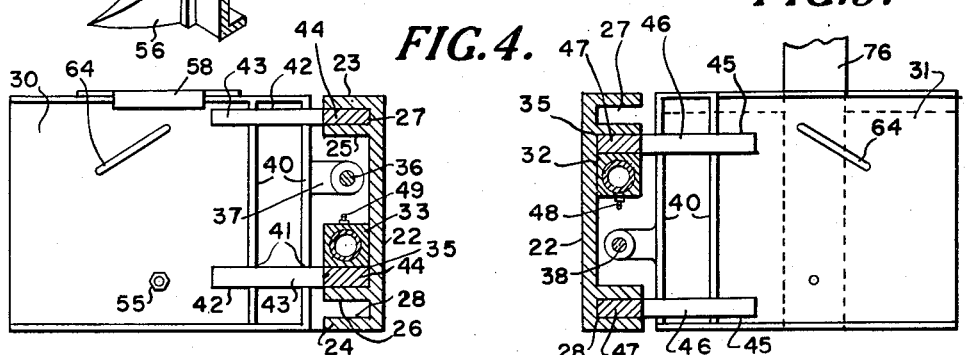
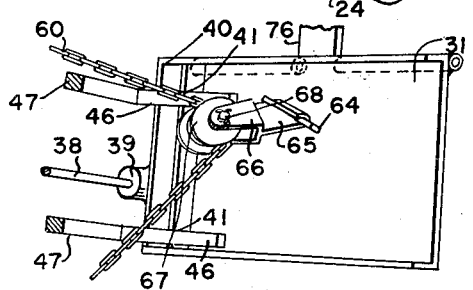
INVENTOR.
SCOTT E. ROSS
BY
ATTORNEYS

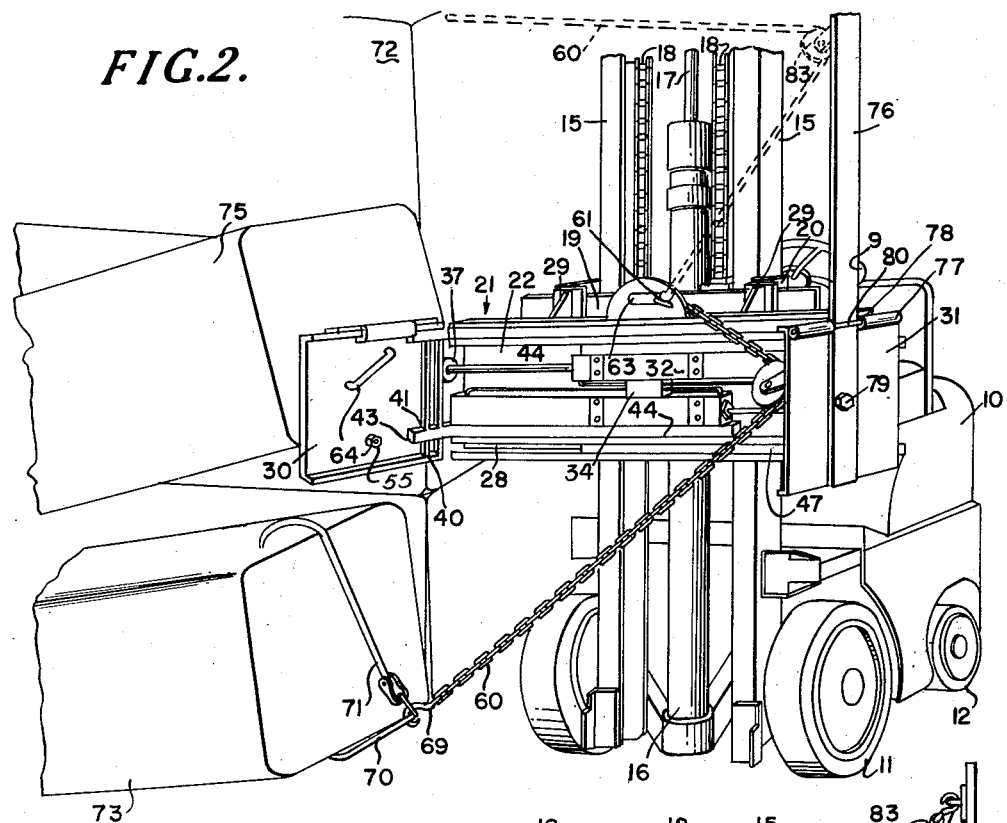

United States Patent Office 2,837,231
Patented June 3, 1958

2,837,231
BALE-HANDLING ATTACHMENT FOR INDUSTRIAL TRUCKS AND THE LIKE

Scott E. Ross, Shreveport, La., assignor to American Compress & Warehouse Co., Inc., Shreveport, La., a corporation of Louisiana Application August 2, 1955, Serial No. 525,998

10 Claims. (Cl. 214—620)

The present invention relates to a clamp-carrying machine or truck useful for handling bales of cotton and the like, and, more particularly, to a bale-handling attachment connected to such a machine.

At present, it is customary to store bales of cotton in warehouses and stack the bales in vertical rows with six or more bales being piled on top of one another. These bales may weigh as much as 500 pounds each. While the bales of cotton are divided into different grades or classes, they may be stored without being grouped or arranged according to quality or grade. It is quite often necessary to separate from the pile or stack, a bale at the bottom or intermediate a pile for the purpose of removing or sampling the same. Heretofore, this operation has been difficult and required the expenditure of considerable time and effort.

Accordingly, a primary object of the present invention is to provide a simple, efficient, compact, and economical bale-handling attachment for clamp-carrying machines in common use comprising means for separating or withdrawing from a stored pile any selected bale without removing or entirely lifting the adjacent bale or bales of a pile, and at a minimum expenditure of time, effort, and cost.

A further object comprehends the provision of means for withdrawing any selected bale in such a manner as to prevent the stacks or piles on either side of the selected bale from falling in when the selected bale is removed and which enables the withdrawing of a selected bale in narrow aisles where cotton is stacked on either side of the aisle.

Another object is to provide means whereby access may be had to any selected bale by tilting the adjacent bale of the stack above the same, so that a sample may be taken from either or both of such bales without removing any of the bales from the stack.

A still further object is to provide a new and improved method of removing a selected bale from a pile or stack in a storeroom or the like by first tilting or raising the bale immediately above the selected bale so that the selected bale is readily accessible for inspection or for engagement with a suitable lifting means so as to be withdrawn from the stack.

A further object of the invention is to provide bale handling or lifting means operable entirely from the side of a stack of bales and which does not require expensive overhead trolley means or other devices extending above the stack in order to lift and remove any of the bales in a stack.

A further object consists in providing the bale-handling attachment with a vertically and laterally movable upright or member which extends above the attachment at least to the top of the stack of bales, and is detachably connected to the top bale so as to withdraw the same from the stack without disturbing the other bales. The upright is particularly adaptable for use where the bales are stacked so high that the bale attachment cannot be moved in transverse alignment with the top bale and it is desired to remove the top bale.

Other objects and advantages of the present invention will become apparent from the following description when taken in conjunction with the accompanying claims and drawings.

Referring to the drawings in which is shown a preferred embodiment of the invention:

Figure 1 is a side view of an industrial truck showing my improved bale-handling attachment connected thereto;

Figure 2 is a detailed perspective view of the bale-handling attachment showing the prong plate member in engagement with a bale immediately above a selected bale and the selected bale operatively connected to a movable member on the truck so as to withdraw the selected bale from the stack;

Figure 3 is a front end view of the bale-handling attachment shown in Figure 1;

Figure 4 is a sectional view taken substantially along the line 4—4 of Figure 3;

Figure 5 is a sectional view taken substantially along the line 5—5 of Figure 3;

Figure 6 is a detailed perspective view with parts in section of the movable prong plate; and Figure 7 is a detailed perspective view of the movable bale plate and its associated parts.

Referring to the drawings, 10 indicates a conventional self-propelled industrial lift truck having front driving wheels 11 and rear steering wheels 12, to which is operatively connected the steering column 13 having a steering wheel 9 positioned adjacent the seat 14 of the operator. Spaced vertical channel-shaped fixed guide members 15 extend upwardly from the front of the truck 10 and are suitably connected thereto. Between and parallel with the guide members 15 is a fluid pressure-operating cylinder 16 having a piston rod 17 which in turn is operatively connected at its upper end, to a pair of channel-shaped members (not shown) which slidably engage the fixed members 15, so as to be vertically movable relative thereto upon the actuation of the piston rod 17. Spaced chains or flexible members 18 are connected to the rear of a transverse plate 19 and to the piston rod 17, so as to impart vertical movement to the plate 19 when the piston rod 17 is actuated. The plate 19 is slidably connected to the guide members 15 by the channel-shaped movable guides 20 which slidably engage the fixed guides 15.

The construction of the truck and clamping assembly may vary, and is well understood in the art, for instance, as disclosed in Patent No. 2,647,650, Sherriff, August 4, 1953. The clamping assembly comprises side plates independently movable toward and from one another to grasp and release the load, said plates being vertically adjustable as a unit, as described.

The industrial truck 10, for the purpose of the present illustration, is shown in the form of a clamp-carrying machine used for picking up cotton in a warehouse or the like. In order to facilitate the removal of a selected bale from a stack or pile and also to provide means for easily sampling any selected bale by raising one bale relative to another, but without removing either bale from the stack, there is provided a bale-handling attachment, generally indicated by the numeral 21 (Fig. 2). The bale-handling attachment includes an elongated transverse channel-shaped housing or carriage 22 having the outwardly extending horizontal upper and lower arms or flanges 23 and 24, respectively (Fig. 4) and the spaced inner flanges 25 and 26 which coact with their complementary outer flanges to form elongated transverse vertically spaced slots 27 and 28 co-extensive in length with the length of the housing 22. The housing or carriage 22 is connected to the plate 19 and the movable guide member 20 by the spaced bracket members 29 so as to be vertically movable therewith upon the operation of the piston rod 17. Extending outwardly and laterally from opposite ends of the housing 22 are independently movable plates or members 30 and 31. Positioned within the housing 22 are a pair of vertically spaced longitudinally extending hydraulic cylinders 32 and 33 connected by a reduced central position 34 (Fig. 3). The fixed cylinders 32 and 33 are spaced longitudinally from the adjacent inner flanges 25 and 26, respectively, so as to form therewith the elongated upper and lower slots 35 (Fig. 3) disposed parallel to but of shorter length than the slots 27 and 28. The piston 32 has a piston rod 36 extending outwardly and connected to the movable plate 30 as at 37 (Fig. 2). The cylinder 33 likewise has a piston rod 38 connected at its outer end to the plate 31 as at 39 (Fig. 7), and which extends in a direction opposite to the rod 36. Each of the movable end plates 30 and 31 may be provided adjacent the housing 22 with vertically spaced ribs 40 having transverse vertically spaced slots 41 (Fig. 7). A pair of vertically spaced substantially L-shaped members or bars 42 are provided with short arms 43 which extend through the slots 41 on the ribs 40 (Fig. 4) and are fixed to the plate in any suitable manner, such as by welding or the like. One of the members 42 has its long arm 44 slidably mounted in the upper slot 27, while the long arm of the other member 42 is slidably mounted in the lower slot 35. A pair of similarly formed L-shaped members or bars 45 are provided with short arms 46 which are centrally connected to the plate 31. The long arm 47 of one of the members 45 is slidably mounted in the upper slot 35 (Fig. 5) and the other in the lower slot 28. Fluid, such as compressed air or the like, may be selectively conducted from a suitable source into and exhausted from each of the cylinders 32 and 33 through a suitable piping system indicated by the pipes 48 and 49. Means, such as any well known designs of manually operable lever control valves 50 and 51 (Fig. 1) and associated fluid pipes indicated as at 52, are provided for selectively and independently controlling the movements of the pistons 36 and 38 so as to cause the plate members 30 and 31 to be moved relative to the plate 22 and towards or away from each other.

To the channel-shaped end plate 30 is connected a prong plate 53 (Fig. 6) which may be secured to the plate 30 in any suitable manner, such as by the threaded bolt 54 and the retaining nut 55 (Fig. 4). Extending outwardly and laterally from the front face of the plate 53 are a pair of sharp prongs or pullout tongs 56 arranged to be impaled into the bale of cotton for tilting or raising the same in a manner and for a purpose subsequently to be desscribed. The upper end portion of the prong plate 53 may be formed with a lateral flange 57 which terminates in a centrally disposed depending reduced flange 58 that is bent inwardly at its end as at 59 so as to overlap the adjacent flange of the plate 30 in order to coact with the bolt 54 to maintain the prongs 56 in a fixed operative position. A bale-engaging chain or flexible member 60 has at one end a hook 61 arranged to be detachably connected to a fixed plate 62 carried by the housing 22 and provided with a transverse slot 63 for receiving the hook 61 (Fig. 2). The inner wall of the end plate 31 (Fig. 7) may also be provided with a similarly shaped loop member 64 to which is detachably connected a hooked bracket or member 65 having a bifurcated swivel end portion 66 between the arms of which is rotatably mounted a pulley roller 67 journalled on pin 68. The chain passes over the roller 67 and at the end opposite to the hook 61 may be loosely and pivotally connected by the hook 69 (Fig. 2), to a V-shaped lower hook member 70 and a co-acting upper hook member 71 so as to detachably grip a selected bale of cotton or other baled material for the purpose of withdrawing the same from a stack or pile. Thus, the prong plate 30 and the bale plate 31 are carried by the truck, so as to provide means for raising and tilting a bale above a selected bale and for withdrawing the selected bale from the stack or for sampling the same.

It will be understood that any suitable size of hook or other arrangement may be provided at the end of the chain 60 to engage or grip the bale 73 for purposes of removing same.

In operation, the bales of cotton 72 (Fig. 2) are stored in a warehouse in vertical piles or stacks on opposite sides of an aisle. If it is desired to withdraw from this pile, a selected bale such as the bale 73 or to sample that bale or the one above it, the truck 10 is moved down the aisle by the operator between the stacks of cotton to a point opposite the bale 73. The fluid pressure in the cylinders 32 and 33 has previously been withdrawn so that the displaceable end plates 30 and 31 are moved close to the adjacent ends of the housing and disposed substantially parallel to each other. The piston rod 17 in the cylinder 16 is then actuated by the operation of a control lever 74 (Fig. 1), adjacent the seat 14 so as to simultaneously to raise the housing 22 and the end plates 30 and 31 in transverse alignment with the bale 75 immediately above the bale 73. The control lever 50 is then actuated by the operator to move the plate 30 outwardly and laterally away from the housing 22 so that the lifting prongs 56 penetrate the adjacent side of the bale 75 a sufficient distance to firmly hold the same. The lever 74 is then actuated to move the handling attachment 21 vertically relative to the truck 10 any desired distance. This movement simultaneously causes the tilting of the bale 75 next above the bale 73, as well as any other bales supported on and above the bale 75, so that it assumes the position as shown in Figure 2. The chain 60 is then passed over the swivel pulley roller 67 and connected by the hook 61 to the plate 62. The hooks 70 and 71 or other equivalent means are then attached to the selected bale 73 and the valve lever 51 is actuated, causing the end plate 31 to be moved outwardly and laterally away from the housing 22, so as to pull out or remove the bale 73 from the stack 72. The selected bale 73 may then be clamped between the members 30 and 31 and the bale attachment elevated on the truck so as to be withdrawn from the warehouse.

It will be seen that by reason of the present method of handling bales of cotton, the operation of withdrawing a selected bale or of sampling the same is much faster than those heretofore used. The withdrawal of the selected bale by the handling attachment prevents the stack 72 on either side of the selected bale from falling in when the latter is withdrawn. Moreover, bales of cotton or other packed material may be easily withdrawn from narrow aisles where it is stacked on either or both sides of an aisle. Additionally, a sample of the quality or grade of the cotton can be taken by raising one bale from another without removing either bale from the pile.

It will be apparent that a bale-clamping assembly with the attachments described herein may be conveniently applied to a conventional industrial lift truck to provide the advantages of the present invention. Similarly, existing trucks provided with adjustable plates to grip a bale or the like may be conveniently equipped with the prong plate, chain and hook attachments as described, to provide the advantages of the invention.

Where the top bale in a stack is positioned above the guide members 15 of the truck and it is desired to withdraw the top bale, the movable plate or member 31 may be provided with an upright 76 (Fig. 2) in the form of a flat metal plate of such length as to extend above the members 15 and at least to the top bale in the stack. The movable member 31 may have welded to its outer upper surface a transversely disposed tubular bead 77. The bead 77 has a centrally disposed interrupted portion or slot 78 (Fig. 2) of such length as to receive the plate 76. A threaded bolt 79 connects the plate 76 to the outer face of the member 31 and a rod 80 is arranged to extend through the tubular member 77 and across the slot 78 in front of the plate 76 so as to coact with the bolt 79 to releasably maintain the upright 76 in a fixed position. The upper end of the plate 76 is provided with a loop 81 (Fig. 3) to which is detachably connected a pulley 83 through which the chain or flexible member 60 may pass, as shown in dotted lines in Figure 2, so as to be connected to the top bale in a stack when it is desired to remove this bale, and when the fixed guide members 15 on the truck are not tall or long enough to allow the bale attachment to reach the top of the stack. When removing the top bale, the prong-engaging member 30 is operated, as previously described, so as to firmly engage the bale adjacent the same when the attachment 21 has been moved upwardly to its extreme position, so as to prevent the bales below the top bale from being disturbed when the top bale is withdrawn by the outward and lateral movement of the upright 76 and the member 31.

The invention may be applied to various types of trucks and machines, and may be used in handling various articles, by varying the specific means disclosed for engaging the articles being handled.

It will be understood that the form of the invention shown is merely illustrative and that such changes may be made as come within the scope of the following claims.

I claim:

1. In combination with an industrial truck having a vertically movable member, means for actuating said member, a bale-handling attachment connected to said member so as to be vertically movable therewith, said attachment including a housing extending transversely of the truck, spaced end plates extending outwardly and laterally from opposite ends of the housing, means movably connecting the end plates to the housing so that the end plates are displaceable horizontally relative to each other, one of said end plates constituting a prong plate and the other a bale plate, said prong plate having lifting prong means extending outwardly and laterally thereof and arranged to penetrate a bale of material, means connected at one end to the truck and arranged to be detachably connected at its opposite end to a selected bale, means operatively connecting the flexible means to the bale plate, and means operatively connected to said plates for selectively moving the same relative to the housing.

2. In combination with an industrial truck having a vertically movable member, means for actuating said member, a bale-handling attachment connected to said member so as to be vertically movable therewith, said attachment including a housing extending transversely of the truck, spaced end plates extending outwardly and laterally from opposite ends of the housing, means movably connecting the end plates to the housing so that the end plates are displaceable horizontally relative to each other, one of said end plates constituting a prong plate and the other a bale plate, said prong plate having lifting prong means extending outwardly and laterally thereof and arranged to penetrate a bale of material, flexible means connected at one end to the truck and arranged to be detachably connected to a selected bale at its opposite end, means operatively connecting the flexible means to the bale plate, and fluid-operating means operatively connected to said end plates for selectively controlling the movement thereof relative to the housing.

3. In combination with an industrial truck having a vertically movable member, means for actuating said member, a bale-handling attachment connected to said member so as to be movable therewith, said attachment including a housing extending transversely of the truck, and in front of the same, spaced end plates extending outwardly and laterally from opposite ends of the housing, means movably connecting the end plates to the housing so that the end plates are displaceable horizontally relative to each other, one of said end plates constituting a prong plate and the other a bale plate, said prong plate having lifting prongs extending outwardly and laterally thereof and arranged to penetrate a bale of material, flexible means connected at one end to the truck and arranged to be detachably connected at its opposite end to a selected bale, means operatively connecting the flexible member to the bale plate, means operatively connected to said plates for selectively moving the same relative to the housing, the parts being constructed and arranged so that when the truck is moved opposite a selected bale of a stack, the prong plate is moved to cause the prongs to penetrate the bale immediately above the selected bale, the handling attachment then is raised to tilt the prong-engaged bale, and the flexible member is connected to the bale plate and to the selected bale so as to move the latter away from the stack.

4. Apparatus for handling relatively heavy articles stacked one upon another comprising a mobile support movable to a position at the side of the stacked articles, a first article engaging member vertically adjustable on said support, into alignment with one of the articles in the stack, means on said support for moving said member horizontally outwardly from said support to positively engage the article, means on said support for elevating said member on said support to thereby lift said article and any other articles of the stack supported thereon, a second member carried by said support and longitudinally spaced from said first member, said second member having means for engaging a second article in the stack below the article engaged by said first member, and means on said support for moving said second member to pull said second article from the stack.

5. A construction in accordance with claim 4 wherein said first member comprises a prong to impale the article at its outer end to tilt same upwardly when said first member is elevated, and wherein said second member comprises a hook for engagement with the second article.

6. A construction in accordance with claim 4 wherein said members comprise a pair of spaced clamping plates mounted for vertical movement on said support and for relative horizontal movement from and toward each other, and which are adapted to clamp the article between them to convey the article when said support is moved.

7. A bale-handling attachment for industrial trucks including longitudinally spaced movable members, one of said members having prong means extending outwardly and laterally therefrom for engaging a bale of material, means when the attachment is positioned adjacent a bale of a stack for moving the prong means to engage said bale, means operatively connecting the other movable member to a selected bale below said prong means, and means for moving said last-mentioned movable member outwardly when connected to the selected bale for withdrawing the same from the stack.

8. Apparatus for handling material stacked in bales one upon the other, said apparatus including a support movable to a position at one side of the stacked bales, a first article-engaging member vertically adjustable on said support so as to be movable in alignment with one of the bales, means on said support for moving said member outwardly and laterally from said support to engage an adjacent bale, a second member carried by said support and longitudinally spaced from said first member, means for connecting said second member to a selected bale below said first member to withdraw the selected bale from the stack, and means for actuating said second member when connected to the selected bale in order to remove the same from the stack.

9. A bale-handling attachment for industrial trucks including spaced movable members, one of said members having prong means extending outwardly and laterally therefrom for engaging a bale of the material, the other of said members having an upright extending at least to the top of a stack of bales, means when the bale attachment is positioned adjacent a bale below the top of the stack for moving the prong means to engage the same, means operatively connecting the upright to the top bale of the stack, and means when the prong means engages an adjacent bale and the upright is connected to the top bale for moving the upright outwardly relative to the stack so as to withdraw the top bale from the stack.

10. A bale-handling attachment for industrial trucks and the like, including a vertically movable carriage, laterally spaced first and second members slidably connected to said carriage so as to be movable towards and away from each other, said first member having bale-engaging means whereby elevation of the carriage tilts the bale upward, means when the attachment is positioned adjacent a selected bale of the stack for advancing said first member laterally into engagement with the bale above the selected bale, means for then raising the carriage so as to tilt the bale engaged by said first member, and means for operatively connecting said second member to the selected bale whereupon the bale may be either inspected or withdrawn from the stack.

References Cited in the file of this patent

UNITED STATES PATENTS

| | | |
|---|---|---|
| 1,149,250 | Davis | Aug. 10, 1915 |
| 1,149,310 | Von Phul | Aug. 10, 1915 |
| 2,150,960 | Bertel | Mar. 21, 1939 |
| 2,490,772 | Benner | Dec. 13, 1949 |
| 2,576,355 | Parmesan | Nov. 27, 1951 |
| 2,647,650 | Sherriff | Aug. 4, 1953 |
| 2,706,570 | Jewell et al. | Apr. 19, 1955 |